United States Patent Office 3,090,779
Patented May 21, 1963

3,090,779
METHOD OF EXTRACTING PROTEIN AND LIPID FROM RAW VEGETABLE MATERIALS
Israel Harris Chayen, London, England, assignor to C.C.D. Processes (N.Y.) Ltd., New York, N.Y., a corporation of New York
No Drawing. Filed Aug. 26, 1959, Ser. No. 836,053
Claims priority, application Great Britain July 8, 1959
2 Claims. (Cl. 260—112)

This invention relates to a method of extracting proteins and lipids from raw vegetable materials.

In my co-pending application, Serial No. 688,129, filed October 4, 1957, now Patent No. 2,928,821, for Synthetic Protein-Lipid Complex and a Method of Making the Same From Raw Vegetable Materials, of which this application is a continuation-in-part, I have described and claimed a method of treating raw vegetable materials in a manner such that the proteins and lipids which are recovered are in the form of a tight complex of extreme stability. Although this product is extremely useful, for example, as an animal and human foodstuff, under certain conditions it is preferable to substantially reduce the lipid content thereof and to substantially eliminate other compounds which tend to make the product distasteful to some people. For example, there are present in a protein-lipid complex made in accordance with my aforesaid application fat-soluble substances such as phospho-lipids and some strongly smelling oils and essences which impair the acceptability of the complex for human consumption. It has not been found possible to remove these substances from the stabilized dried protein-lipid complex by any solvent or combination of solvents, said substances apparently having been accepted, i.e., incorporated, in the complex upon the drying step which stabilizes the complex.

It is an object of the present invention to provide a method whereby these substances are eliminated.

It is another object of my invention to provide a method of the character described for extracting from raw vegetable materials a protein which is substantially free from lipids.

The extraction of protein from raw vegetable materials is markedly high where the raw vegetable material at some stage during the extraction process is treated with an alkaline material, hammermilled and subsequently acidulated and, therefore, it is extremely desirable to use these steps in such a recovery. However, as pointed out in my said co-pending application when a protein thus extracted is dissolved in an aqueous alkalinized carrier, is coagulated by acidulation and then is dewatered it forms a highly stable complex with the lipids that are present. For certain commercial uses, e.g. in some molding operations, it is desirable to have the protein in a substantially pure form and to use plasticizers other than the lipids extracted from the raw vegetable material. Also it sometimes is desirable to greatly lower the lipid content when the protein is used as a foodstuff, i.e. additive. In these instances, although maximum protein extraction is obtained by alkalizing, hammermilling and acidulating the raw vegetable material, complexing of the protein with lipid is a serious drawback.

Accordingly, it is a further object of my invention to provide a high yield process of the character described wherein protein is recovered from raw vegetable materials by a method which includes alkalizing, hammermilling and acidulation, but wherein the lipid is prevented from complexing with the protein so that the protein and lipid can be independently recovered.

Other objects of my invention in part will be obvious and will in part be pointed out hereinafter.

My invention accordingly consists in the series of steps which will be exemplified in the following description and of which the scope of application will be indicated in the appended claims.

In general I carry out my invention by subjecting raw vegetable materials to the singular severe mechanical treatment of hammermilling under certain critical conditions, alkalizing the raw vegetable material either before, during or after the hammermilling treatment, subsequently acidulating the alkalized aqueous fluid in which the proteins are dissolved, removing a substantial fraction of the aqueous liquid but not enough to stabilize the complex, and then removing most of the remainder of the aqueous liquid by azeotropic drying.

More specifically my invention is carried out by adding raw vegetable material to an aqueous liquid carrier, i.e. a carrier that principally constitutes water. While thus liquid borne, the raw vegetable material is passed through a hammermill, that is to say, a piece of mechanical equipment consisting of a circular (usually tubular) casing in which fixed or pivoted elements are rotated at high speed about the central axis of the casing. Conventionally the hammermill has an inlet in its upper half and an outlet in its lower half, the outlet usually being axially spaced from the inlet. It should be observed at this point that no other type of mechanical treatment is capable of effecting my invention. For instance, if the raw vegetable material is ground, ball-milled, pebble-milled, crushed, flaked, pressed, mortared, rolled dry or with the liquid, or subjected to ultrasonic vibration by piezo electric crystals or other vibrating elements, the high recovery of protein which I obtain will not be achieved.

The conditions under which the hammermill operates are critical. One condition is that there must be at least a certain liquid-to-solid weight ratio. In the preferred form of my invention, the weight of the liquid is at least three times the weight of the raw vegetable material, although under special conditions, e.g., with raw vegetable materials having very small cells, it is possible to secure usable results where the weight of the liquid is only twice the weight of the raw vegetable materials. The use of less than the critical amount of liquid causes the hammermill to reduce the raw vegetable materials to a paste or emulsion and the detritus to such a fine state that its removal becomes commercially infeasible. Where at least the critical amount of aqueous liquid is present, I believe that the carrier acts as a medium for the transmission of rapidly repeated severe hydro-dynamic shock waves that are engendered by the tips of the rapidly rotating elements striking the liquid as it is fed into the hammermill or as it travels through the hammermill.

More than the minimum indicated liquid-to-solid ratio can be employed, the best range being between 3 and 8. Still more liquid can be used if desired but no particular advantage results and as a practical matter, a top ratio of 15 is as high as the process should be operated if reasonable efficiency is to be secured.

The second critical condition is the dwell time of the raw vegetable material in the hammermill. I prefer to use a dwell time of as little as two-thirds of a second and have secured eminently desirable results with a dwell time of as long as three seconds. About one second customarily yields the best results. It is not usually desirable to extend the dwell period further than three seconds since the longer the retention time of the raw vegetable material in the hammermill, the finer will be the resultant size of the vegetable debris. The fine debris tends to encourage emulsification, to promote colloidalization, and to be difficult to remove. However, where the retention time is maintained sufficiently short, e.g., not to exceed ten seconds and preferably not to exceed five seconds, commercially practical results are secured.

A suitable method of setting the dwell time in the hammermill is by selection of the sizes of the openings in the screen or grating covering the hammermill outlet and through which the material is discharged. The hammermill utilized for carrying out my invention is a continuous flow mill rather than a batch mill.

The third critical condition of the hammermilling step is the tip speed. It is necessary for the linear, i.e. tip, speed of the hammers to be at least in the order of 5,000 ft. per minute for positive results, although a slightly lower tip speed, e.g., in the order of 4,000 ft. per minute is useful in some cases, for instance, for weak walled cells. Nevertheless, I prefer not to use such low tip speeds inasmuch as I am not able to secure with them a maximum extraction of protein and the process then runs inefficiently. It is within the scope of my invention to use higher tip speeds. With present-day materials and mechanical strength limits, 20,000 ft. per minute is a practical upper limit.

I have observed and it is a fourth condition of the hammermilling step of my invention that the high speed multiple rapidly repeated hydrodynamic shock waves which I utilize to disrupt the natural cell structure and to discharge the cell contents into the aqueous liquid are characterized by the fact that they do not essentially attrite the cell walls as by abrasion or mechanical rubbing thereby to leave cell debris of smaller than cell size. Rather, these shock waves burst the walls of masses of cells while leaving the masses as single structures, i.e. as large groups of ruptured coherent cells, so that the solid material left in the aqueous liquid carrier will, under magnification, have a honeycomb-like porous structure whereby the presence of fine solid particulate material which is highly detrimental to further treatment is avoided. Phrased differently, the residual solid material predominantly larger than cell size.

Further pursuant to my invention the protein which has been discharged into the aqueous liquid carrier is treated so as to raise the pH of its surroundings to a point at which the protein will dissolve in the carrier. This treatment, which I desecribe as alkalizing, can be carried out by introducing the raw vegetable material into the hammermill in an alkalized aqueous liquid carrier, by introducing an alkalizing agent into the hammermill along with the raw vegetable material and the aqueous liquid carrier, or by alkalizing the liquid carrier after the hammermilling. The pH of the aqueous liquid carrier is, as is well known, raised to a point at which the protein will dissolve in the carrier. The dissolved protein under the critical conditions present during the hammermilling will combine with the lipid that has been discharged from the raw vegetable material to form a synthetic protein-lipid complex which will coagulate, i.e. precipitate, upon subsequent acidulation below the isoelectric point, it being a feature of the present invention that I do not permit this complex to become stable.

Typical raw vegetable materials with which my invention may be employed, it being understood that the same are given only by way of example, inasmuch as my invention can be practiced on all raw vegetable materials, although preferably on those in which are present non-fibrous, i.e., globular, proteins, are: ground nuts, cereals, oleaginous and leguminous seeds, leaves and grasses, such as peanuts, tung nuts, cashew nuts, palm kernel nuts, walnuts, shea nuts, coconuts, copra, wheat, rye, oats, maize, soy beans, cotton seeds, sesame seeds, linseed, flax seeds, rape seeds, sunflower seeds, hemp seeds, rubber seeds, castor beans (detoxified by any known process), tree leaves, carnauba leaves, potato tops, beet tops, kale and all wild and domestic grasses, e.g., lucerne and rye.

Typical of the liquids to be fed with the raw vegetable material to a hammermill are: tap water, distilled water being too expensive and unnecessary, and water which has had added thereto an alkalizing agent. As will be seen later, my invention works equally well with plain water and alkaline water, although in the former case an additional step is necessary. It also is within the scope of my invention for the water fed to the hammermill with the raw vegetable material to be acidified.

To alkalize the water, I may use any chemical which does not irreversibly react with the protein or oil of the raw vegetable materials employed and which has no toxic effect. As will be understood by those skilled in the art, a great number of chemicals answer this description. However, I prefer to employ one which is quite inexpensive, as it is necessary for commercial reasons to run the process on an economically sound basis; hence, a preferred chemical is sodium hydroxide. Sodium or potassium carbonate also may be employed.

For acidulation, either when the initial treatment in the hammermill is acidulated water or subsequently when it is desired to lower the pH to at least the isoelectric precipitation point, I may use any suitable acid. However, in this case as well it is desirable to employ a readily available inexpensive acid and for this purpose I prefer to employ an acid such as hydrochloric acid.

Any type of hammermill may be utilized in practicing my invention provided, of course, that it meets the description hereinabove given as to tip speed and as to ability to vary the retention time when the hammermill is running on a continuous basis. A typical hammermill is a Christy and Norris No. 2½ (18" by 12"), this being a standard type swing beater mill. The mill typically is fitted at its discharge outlet with a perforated plate having $\frac{1}{32}$" openings therein. A suitable rate of rotation is 2500 r.p.m. I also have secured useful results with a larger mill, i.e., a 24" by 24" hammermill, of the type just described, wherein the rotor diameter is 22" and the same was driven at 2500 r.p.m.

It may be mentioned that the temperature of the liquid fed into the hammermill along with the raw vegetable material is not critical, and it is most economical and, therefore, preferable, to employ the same at tap temperature which usually is about 45 to 55° F., the actual temperature being immaterial. However, it should be understood that my invention does not exclude the use of chilled or heated liquid, that is to say, my invention will work satisfactorily with liquids whose temperatures are either raised or lowered, although normally the process will not be run in such fashion due to the additional costs involved in heating or cooling large quantities of liquid.

As will be understood from the previous description, after the raw vegetable material has been hammermilled to discharge protein and lipid into the aqueous liquid carrier and after the aqueous liquid has been alkalized so as to dissolve the protein, these two steps having been carried out in any order, the carrier is acidulated to reduce the pH to or below the isoelectric point for the protein.

Next, pursuant to the present invention, I mechanically remove a substantial amount of the aqueous carrier to leave a slurry or paste, e.g., to reduce the liquid-to-solid ratio to about 4 to 1. This specific ratio is not critical, the amount of fluid thus quickly removed in bulk at this point of the process simply being a matter of economics. The aqueous liquid is removed in a simple inexpensive manner, preferably without the application of heat. By far the most desired method of removing the liquid is a gravity method such, for instance, as centrifugation or settling followed by decantation, thereby to remove the water en masse, so to speak, at a low cost.

Finally, I remove substantially all the balance of the water by a method which substitutes a non-aqueous fluid for the water and in this manner prevent the complex from stabilizing. Specifically, I employ azeotropic drying, i.e., azeotropic distillation. The azeotropic drying is accomplished by boiling the water off as an azeotrope with a suitable organic volatile liquid that will form a constant boiling point mixture of water and the organic liquid. Said organic liquid preferably has a boiling point not in excess of 150° C. and preferably no greater than 135° C. The temperature of the azeotrope mixture will, as is well known, be below the boiling point of either of the two liquids involved and, therefore, will be below the boiling point of the water. Desirably the organic liquid which is added to the paste to form the azeotrope is a liquid which is non-miscible with water to facilitate subsequent recovery of said liquid for further use. Moreover, this organic liquid is non-polar. The organic liquid is added in an amount in excess of that required to form an azeotropic mixture with all the water present or a lesser amount can be added and then subsequently additional organic liquid added as the boiling progresses. Inasmuch as the presence of the organic liquid initially will form an azeotrope, even if less of the organic liquid is present than is required initially to convert all of the water present to an azeotrope, the azeotrope will first boil, since the boiling point thereof is below that of water, and the subsequent addition of more organic liquid eventually will transform the balance of the water to an azeotrope.

The boiling is continued until the azeotrope has been completely boiled off and the only free liquid remaining is, therefore, the organic liquid. This will be recognized by a sharp rise in the boiling temperature. It will be understood that a tiny amount of water may remain. It is believed that this is present in a complex with the coagulated protein and is, therefore, not susceptible to formation of an azeotrope.

Next, the residue is repeatedly washed with more of the non-polar organic liquid to break the now loosely bound complex. This liquid will remove some of the lipids and some of the chlorophyll (the fractions thereof that are soluble in a non-polar solvent) being able so to act due to the dewatering of the paste and the now almost negligible bonding between the lipid and protein. The portion of lipid fraction thus removed can be recovered subsequently in a conventional manner in a still, the solvent being removed by distillation.

Finally, the solids that still remain are washed with a polar solvent which will remove the remainder of the lipid materials, the remainder of the chlorophyll, the carotene and the balance of the objectionable odorous materials that may still be present. All of these too can be recovered in the usual manner by subsequent distillation with a still.

Typical non-polar liquids which can be used to form the azeotrope and for subsequent washing are: hexane, propane, toluene, xylene and any of the gasoline fractions, these all being non-miscible with water.

It is pertinent to observe at this point that the invention can be practiced by using water miscible liquids for the azeotropic drying but this imposes expense and difficulties for the recovery of the organic liquid when it boils off the water.

Typical polar liquids which can be used for the second washing step are: acetone, methyl alcohol, ethyl alcohol, propyl alcohol, ethers and ketones.

I have set forth below various examples of my process:

*Example I*

1,000 grams of decorticated (skinned) peanuts testing 4.58% nitrogen and 43.6% oil before treatment were passed through a 9″ hammermill, i.e., a hammermill having a rotor 9″ in diameter, running at a speed of 8500 r.p.m. and having fitted over its discharge outlet a plate perforated with 1/32″ openings. The peanuts were fed into the mill along with five times their weight of an 0.1% caustic soda water solution. The caustic soda water solution was at a temperature of 45° F. as were all of the other water and water solutions fed into the mill in the subsequent examples. The retention time of the material in the mill was about 1 second.

The mixture discharged from the hammermill was passed to a basket centrifuge to remove the solid debris in a well-known manner. Said centrifuge operated at about 400 g. The solids so removed then were washed with an equal weight of tap water to remove the entrained mother liquor which was added to the separate liquid secured from the first centrifugation in the basket centrifuge to form an alkaline water phase. Next the alkaline water phase was acidulated to bring its pH to about 4.8, hydrochloric acid being used for this purpose and being added at ambient temperature. This pH is below the isoelectric point of peanut protein so that such acidulation precipitated all the dissolved protein that was present. However, as explained earlier, the protein and lipid extracted from the raw vegetable material in the manner specified and dissolved in water combined automatically to form a loosely bound synthetic protein-lipid complex, so that upon acidulation the complex, rather than the protein, precipitated. Acidulation was performed in a suitable receptacle, the hydrochloric acid being stirred into the liquid in the cold.

The precipitate was recovered by centrifuging in the same basket centrifuge, for example, the same one as that employed for removing the solid debris. The recovered complex was washed with acidulated water and recentrifuged.

At this point the complex still was not highly stable. It had been dewatered by the centrifuging to a paste containing about 80% by weight of water. Alternately, the de-watering could have been accomplished by filtration or by gravity separation followed by decantation. It is not efficient, i.e. economically feasible, to perform this de-watering step by evaporation.

If next the paste is dried by the application of heat as described in my aforesaid application, for instance, with hot air or by contact with a heated conducting surface, to a moisture content not exceeding 8%, it thereafter will not be possible by any known industrial process to break up the protein-lipid complex and recover the protein and lipid components separately. In many cases it is not necessary or desirable to thus separate the protein-lipid complex into its constituents since in the complex form the two compositions are particularly useful for certain applications. However, for other uses, it is desirable to separate the protein and liquid fractions. For instance, it may be desired to obtain a substantially fat-free protein to be used as a molding plastic with a plasticizer other than natural lipids; or it may be desired to recover the lipids independently of the protein for separate use in an industrial process, e.g., for the making of margarine or for further treatment to prepare pharmaceutical compounds.

I recover the proteins and lipids separately by drying the aforesaid mechanically dewatered paste complex by azeotropic drying. Specifically, in the example under consideration, I add toluene to the dewatered paste. More than enough toluene is added to form an azeotrope with all the water present. This can, as noted earlier, be added all at once, but I prefer to add less initially than is necessary for complete transformation. Preferably, about one-half as much. Subsequently, the other half is added during the boiling step. Moreover, I add more toluene than is exactly necessary to just barely change all the water present to an azeotrope. Sufficient additional toluene is added to maintain the complex as a paste after the azeotrope is boiled off. Typically I add in toto 8 lbs. of toluene initially for each pound of the 80% water paste. Enough toluene is used for the ultimate amount of toluene present after the azeotrope has been boiled off completely to be about the same as the amount of water originally present in the paste. The toluene added to the water-complex paste will boil off at 84° C. despite the fact that the water has a boiling point of 100° C. and the toluene a boiling point of 108° C. The boiling is continued with its temperature being carefully watched and with toluene being added as the boiling is maintained to prevent the boil off of any water per se until the temperature sharply rises to 108° C. At this time the only liquid remaining in a substantial quantity is toluene. The moisture (water) content at such time is between four to six percent by weight of the solids present.

Next the paste which consists of toluene and the protein-lipid complex is washed with fresh toluene. This removes the non-polar solubles, specifically, the toluene-soluble lipid fraction and the toluene-soluble chlorophyll fraction. Said lipid fraction and chlorophyll fraction are recovered by distillation with a still in the usual manner.

Thereafter, the complex is washed with a polar solvent, specifically acetone which dissolves and removes the polar soluble fraction of the lipids and of the chlorophyll. It also dissolves and removes the carotene. Finally, the remainder of polar solvent with which the protein is wetted is evaporated. Substantially all of the materials other than the protein were soluble in one or the other of the polar and non-polar solvents, i.e., the toluene and the acetone. Although it is in the scope of my invention to utilize further solvents of the polar and non-polar type, I have found that these two solvents function satisfactorily to carry out my invention.

The lipid content is very greatly reduced by the aforesaid treatment, there being left only a tiny fraction in the order of one percent by weight of the solids.

*Example II*

1,000 grams of decorticated peanuts of the same assay as that specified in Example I were treated in the same manner as in the first example with five times their weight of an 0.1% caustic soda water solution, and the alkaline water phase was separated in the same way from the solid debris in the said basket centrifuge operating at 400 g.

The alkaline water phase obtained from the first centrifugation was introduced into an Alfa Laval separating type centrifuge having effective g of about 15,000. The second centrifugation split the liquid phase into a clear oil phase and into a protein-lipid aqueous alkaline phase.

The protein-lipid aqueous alkaline phase was acidulated to a pH of about 4.8 with hydrochloric acid to precipitate a protein-lipid complex. This complex was separated from the liquid in a basket centrifuge as aforesaid at about 400 g, dried by azeotropic drying and washed with polar and non-polar solvents in the same manner as specified for Example I.

The oil phase from the Alfa Laval centrifugation was washed in a caustic soda solution having a pH of about 8.0 to 8.5 and recentrifuged in the aforesaid Alfa Laval centrifuge whereby to obtain a further protein-lipid-containing aqueous alkaline solution which was precipitated at a pH of 4.8 with hydrochloric acid. This precipitate was separated in a basket centrifuge as aforesaid, azeotropically dried and washed with polar and non-polar solvents in the same manner.

*Example III*

1,000 grams of decorticated peanuts of the same assay as in the previous examples was passed through the same hammermill fitted with the same perforated plate over its discharge outlet together with five times its weight of plain water; that is to say, in this third example the initial treatment was identical with the initial treatments in the first two examples except that the liquid introduced into the hammermill with the peanuts was plain water rather than an 0.1% caustic soda water solution. The mixture discharged from the hammermill was passed through a 400 g basket centrifuge as foresaid to remove the solids which in this instance, due to absence of the caustic soda in the treating solution, contain some of the protein liberated from the cells but still not dissolved.

The liquid phase thus obtained and containing some of the protein in solution was put through an Alfa Laval separating centrifuge of the type hereinabove described and thereby split into an oil phase and a protein-lipid aqueous phase.

The protein-lipid phase was acidulated to a pH of 4.8 with hydrochloric acid and thereby there was precipitated a protein-lipid complex. This complex was separated in the basket centrifuge as aforesaid, azeotropically dried and washed in non-polar and polar solvents in the manner described in Example I to secure separated protein and oil.

The solids from the first basket centrifuge separation were treated with an 0.1% caustic soda water solution equal to five times the original weight of the peanuts, the pH thereof being about 8.0 to 8.5 and were stirred in the cold for about 40 minutes. Then the mixture was put through the aforesaid basket centrifuge to remove the solids still remaining. Said solids again were washed with an 0.1% caustic soda water solution and the washings added to the liquor obtained from the last mentioned basket centrifugation. The protein-lipid aqueous alkaline phases then were put through the foregoing Alfa Laval centrifuge and split into an oil phase and an aqueous phase. The oil phase was added to the one previously obtained and the aqueous phase was acidulated to a pH of 4.8 with hydrochloric acid to precipitate a protein-lipid complex which was dewatered to a paste in a basket centrifuge as aforesaid, azeotropically dried and washed in non-polar and polar solvents as aforesaid to yield separate protein and oil.

The oil phase was washed in the cold with 0.1% of a caustic soda water solution and centrifuged in the aforesaid Alfa Laval centrifuge giving an oil phase and an aqueous phase. The latter aqueous phase was acidulated to a pH of 4.8 with hydrochloric acid to precipitate a protein-lipid complex which upon dewatering in a basket centrifuge, azeotropic drying and plural organic solvents washings as aforesaid yielded separated protein and oil.

The latter oil phase was worked hot at a temperature of 70° C. to separate therefrom an aqueous phase which upon acidulation, basket centrifuging, azeotropic drying and plural organic solvents washings, all in the foregoing manner, yielded protein and oil.

*Example IV*

1,000 grams of decorticated peanuts were treated in the manner set forth in Examples I and II with five times their weight of liquid, the liquid in this case, however, being instead of water or an alkaline water solution, a 0.2% sulfuric acid water solution. In this manner I completely prevented dissolving any of the protein.

The mixture discharged from the hammermill was passed through a basket centrifuge as aforesaid to remove the solids which contained all the protein freed from the cells, the same not being dissolved because of the acid condition of treatment. The liquid phase when then passed through the aforesaid Alfa Laval centrifuge gave a clear oil phase and an aqueous phase. The aqueous phase contained no protein and virtually no oil. Is therefore was discarded.

The solids from the basket centrifuge were stirred in the cold for half an hour with an 0.1% caustic soda water solution equal to five times the original weight of the peanuts in order to bring into solution all of the protein-lipid complex. The solution then was separated from the solid debris in the said basket centrifuge, the residue washed with an 0.1% caustic soda water solution, and the washings added to the solution. Next the pH of the solution was adjusted to 4.8 with hydrochloric acid to precipitate a protein-lipid complex. This complex was dewatered to a paste in a basket centrifuge, azeotropically dried and washed in a plural organic solvents as aforesaid to yield dried protein and oil.

The oil phase was washed in the cold with an aqueous 0.1% caustic soda water solution and centrifuged in the aforesaid Alfa Laval centrifuge to yield a second oil phase and an aqueous phase. The latter aqueous phase was brought to a pH of 4.8 with hydrochloric acid to precipitate a protein-lipid complex which thereupon was dewatered in a basket centrifuge, azeotropically dried and washed in plural organic solvents in the same manner as aforesaid to yield dry protein and oil.

The foregoing examples have dealt with the treatment of raw vegetable materials in which the protein-lipid complexes that are obtained in stable form without azeotropic drying are suitable and indeed often highly desirable for various uses. However, certain raw vegetable materials, particularly some grasses and leaves have present therein phospho-lipids and certain strongly smelling oils and esters which impair the acceptability of the complex for human nutrients. The examples I am now about to describe relate to such a type of raw vegetable material and to the removal of these sometimes undesirable substances therefrom.

*Example V*

750 grams of chopped Italian rye grass was fed into the aforesaid 9″ hammermill which in this instance, however, had its discharge outlet covered with a perforated plate having smaller openings therein, to wit, 1/64″ openings. The mill was spun at 2500 r.p.m. Together with the rye grass I introduced into the hammermill 5,000 grams of a water solution of 1% sodium bicarbonate. Under these conditions the time of retention of the raw grass in the hammermill was about 1 second.

The mixture discharged from the mill was placed in a basket centrifuge of the aforesaid type, e.g., one operating at about 400 g, to separate the solids from the water solution. The solids were washed with a fresh water solution of 1% sodium bicarbonate and the washings added to the mother liquor.

The mother liquor then was brought to a pH of 4.5 with hydrochloric acid. This threw down a precipitate which constituted a protein-lipid complex. The precipitate was dewatered to a paste containing about 80% water in the aforesaid basket centrifuge. The paste was azeotropically dried and washed with non-polar and polar organic solvents as specified in Example I to recover the dry protein and the lipid separately. The amount of lipid present in the dried protein varied from 0.2% by weight to 1.2% by weight in different runs, the amount of lipid which was present in the protein-lipid complex without azeotropic drying being about 14%.

*Example VI*

950 grams of lucerne (alfalfa) was treated in a manner similar to Example V, and it yielded dry protein and lipid as separate components, in contrast to the protein-lipid complex which previously had been obtained without the azeotropic drying.

*Example VII*

5,000 grams of sugar beet tops from harvested sugar beets was treated in a manner similar to that outlined in Example V and it yielded a dry protein and lipids of separate substantially pure compositions.

It thus will be seen that I have provided processes which achieve the various objects of my invention and are well adapted to meet the conditions of practical use.

As various possible embodiments might be made of the above invention and as various changes might be made in the embodiments above set forth, it is to be understood that all matter herein described is to be interpreted as illustrative and not in a limiting sense.

Having thus described my invention, I claim as new and desire to secure by Letters Patent:

1. A method of treating a raw vegetable material comprising, hammermilling said vegetable material in an aqueous liquid, present in a liquid-to-solid ratio of at least two-to-one, for a very short period of time ranging from about two-thirds of a second to about ten seconds, at a tip speed of at least about 4,000 feet per minute whereby high speed multiple rapidly repeated hydrodynamic shock waves disrupt the natural cell structure of said material and discharge the cell contents into the aqueous liquid while leaving the residual solid material predominantly larger than cell size and whereby the proteins and lipids discharged from the cells are rendered singularly mutually reactive, alkalizing the aqueous liquid to dissolve the proteins whereby in the presence of the lipids the two will combine to form a protein-lipid complex which remains dissolved, thereafter acidulating the aqueous liquid to the isoelectric point for the protein whereby to precipitate the newly-formed protein-lipid complex, partially dewatering the complex by gravity separation to leave at least enough of said aqueous liquid to form a paste and then substantially completely dewatering said complex azeotropically by adding a volatile non-polar organic liquid inert to the complex and having a boiling point not in excess of 150° C. and which organic liquid forms an azeotrope with water, and by heating to a temperature high enough to evaporate the residual water along with a portion of the organic liquid, the amount of organic liquid added being sufficient to leave a residual amount of liquid when the complex is substantially completely dewatered, whereby to avoid stabilization of said complex.

2. A method of treating a raw vegetable material comprising, hammermilling said vegetable material in an aqueous liquid, present in a liquid-to-solid ratio of at least two-to-one, for a very short period of time ranging from about two-thirds of a second to about ten seconds, at a tip speed of at least about 4,000 feet per minute whereby high speed multiple rapidly repeated hydrodynamic shock waves disrupt the natural cell structure of said material and discharge the cell contents into the aqueous liquid while leaving the residual solid material predominantly larger than cell size and whereby the proteins and lipids discharged from the cells are rendered singularly mutually reactive, alkalizing the aqueous liquid to dissolve the proteins whereby in the presence of the lipids the two will combine to form a protein-lipid complex which remains dissolved, thereafter acidulating the aqueous liquid to the isoelectric point for the protein whereby to precipitate the newly-formed protein-lipid complex, partially dewatering the complex by gravity separation to leave at least enough of said aqueous liquid to form a paste and then substantially completely dewatering said complex azetropically by adding a volatile organic liquid selected from the class consisting of hexane, propane, toluene, xylene and gasoline fractions to form an azeotrope with the residual water and by heating to a temperature high enough to evaporate the residual water along with a portion of the organic liquid, the amount of organic liquid added being sufficient to leave a residual amount of liquid when the complex is substantially completely dewatered, whereby to avoid stabilization of said complex.

References Cited in the file of this patent

UNITED STATES PATENTS

| 2,444,241 | Beckel et al. | June 29, 1948 |
| 2,928,821 | Chayen | Mar. 15, 1960 |

FOREIGN PATENTS

| 711,432 | Great Britain | June 30, 1954 |